United States Patent [19]

Wentzel

[11] Patent Number: 4,511,173
[45] Date of Patent: Apr. 16, 1985

[54] PICKUP TRUCK CAP HAVING A ROLL-AWAY DOOR

[75] Inventor: Harold G. Wentzel, Union, Mich.

[73] Assignee: Uneek Cap and Door, Inc., Elkhart, Ind.

[21] Appl. No.: 489,582

[22] Filed: Apr. 28, 1983

[51] Int. Cl.³ ............................................. B60P 3/32
[52] U.S. Cl. .................................... 296/156; 296/146; 160/201
[58] Field of Search ............. 296/156, 146, 155, 24 R; 160/201, 202; 308/3.8

[56] References Cited

U.S. PATENT DOCUMENTS 3,148,724 9/1964 Chieger et al. ............... 160/201
3,552,474 1/1971 Finnegan ....................... 160/201

Primary Examiner—Robert R. Song
Attorney, Agent, or Firm—Gordon W. Hueschen

[57] ABSTRACT

There is disclosed a pickup truck cap having a roll-away or sectional overhead door in which the cap has a door frame at the rear thereof with a depending portion adapted to fit in the tailgate receptor portion of the truck bed. The guides for the door comprise channel members of tubular cross-section having a longitudinal side opening facing the door which is provided with apposed, narrow, rolling surfaces and the door is provided with rollers adapted to roll on these rolling surfaces. The rollers have a flange to prevent them from pulling out of the channel and are spring-biased to accommodate rocking of the truck.

9 Claims, 7 Drawing Figures

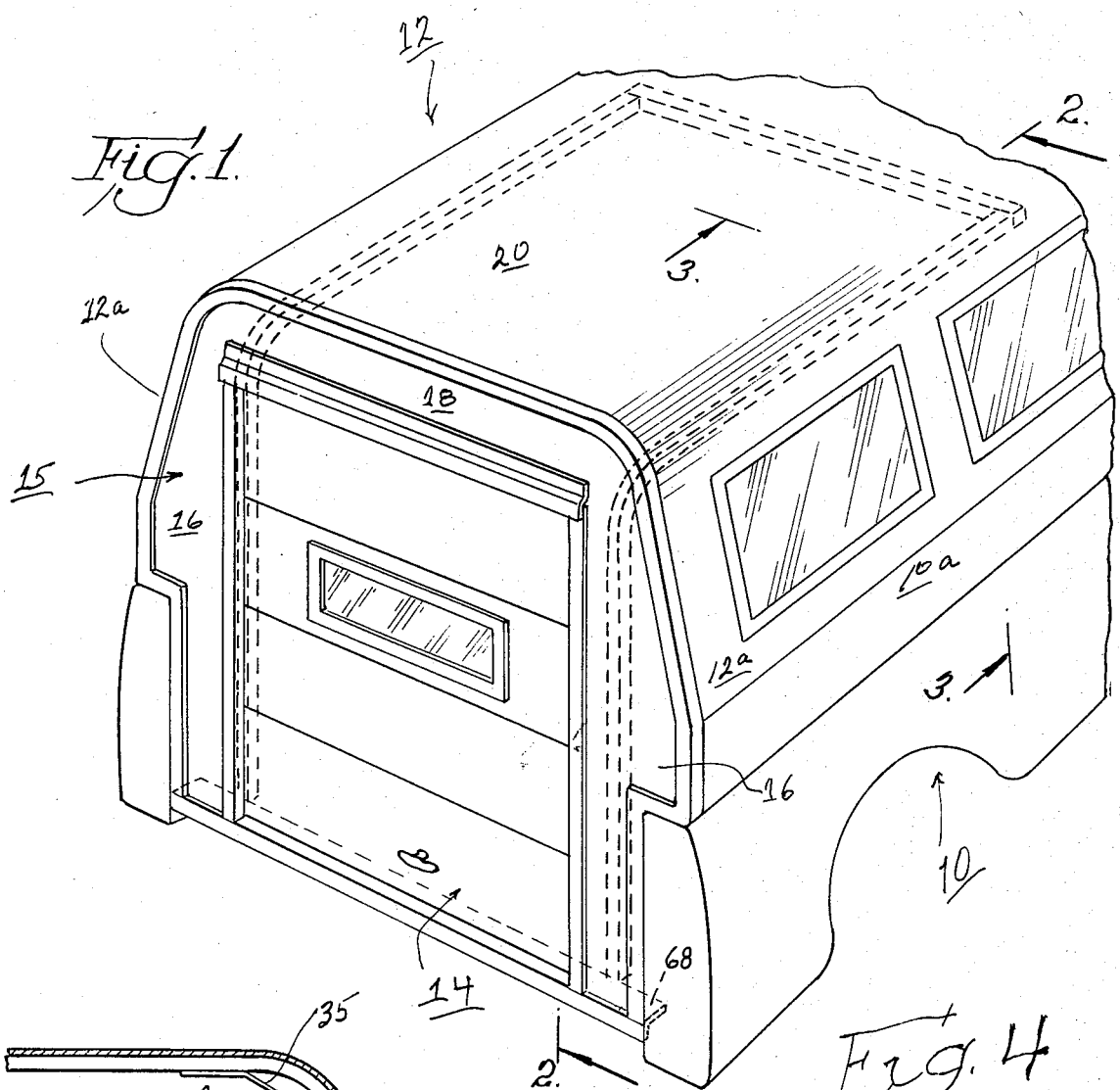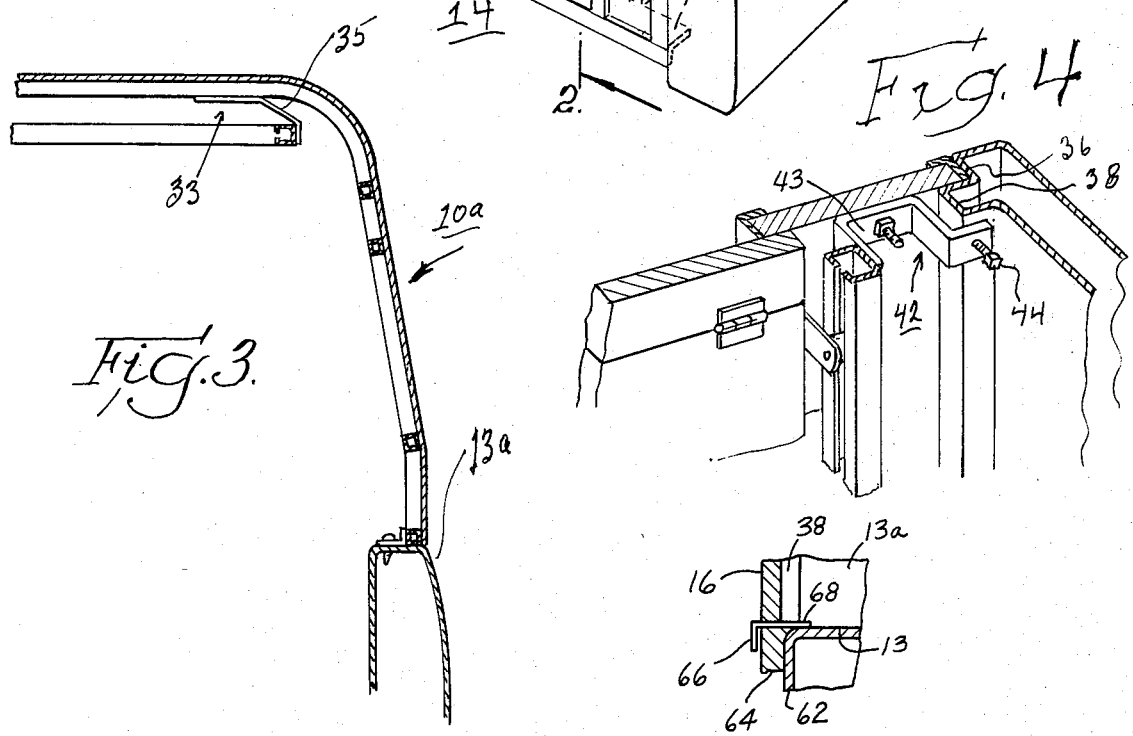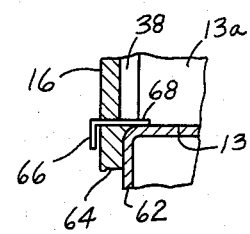

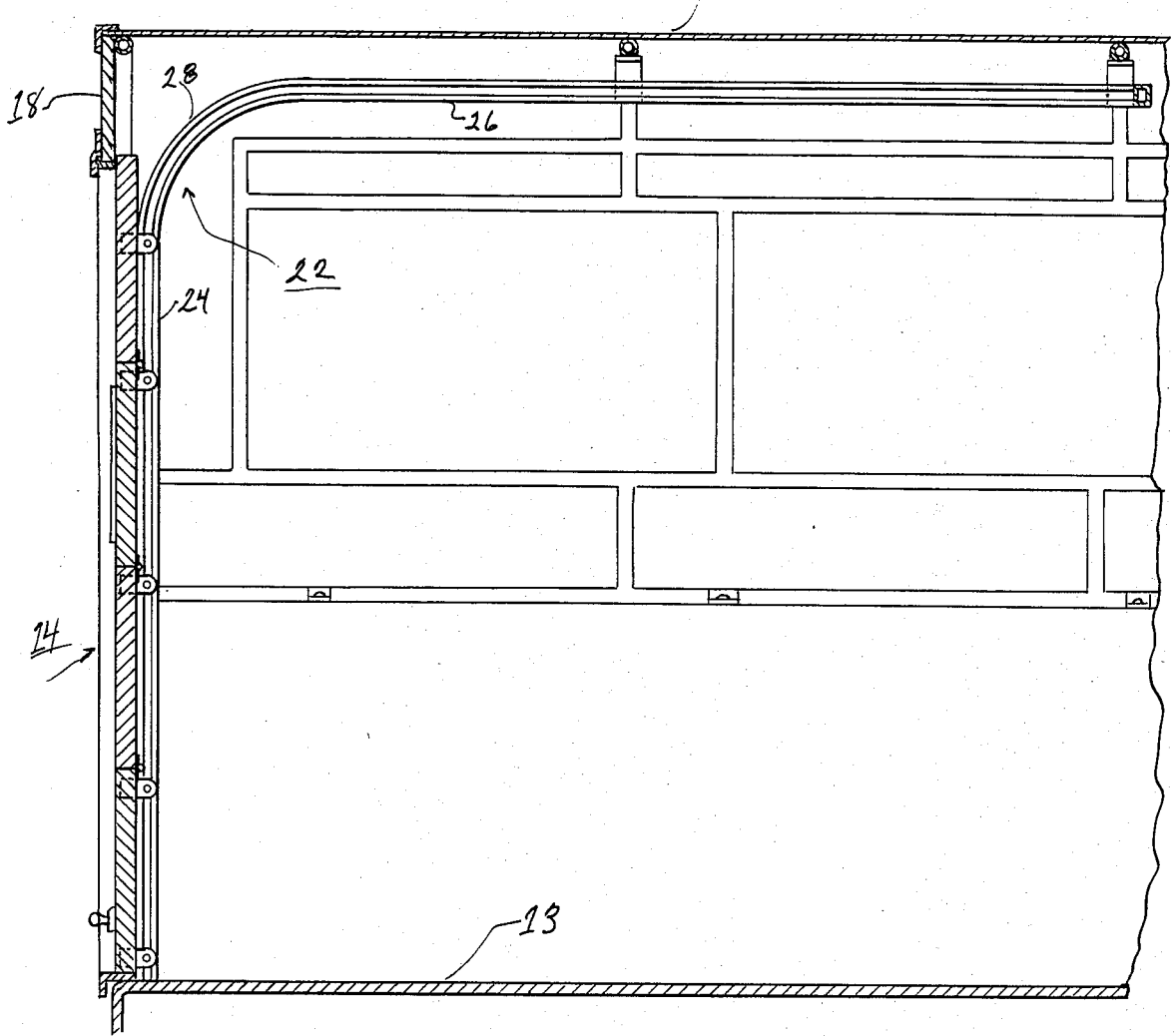
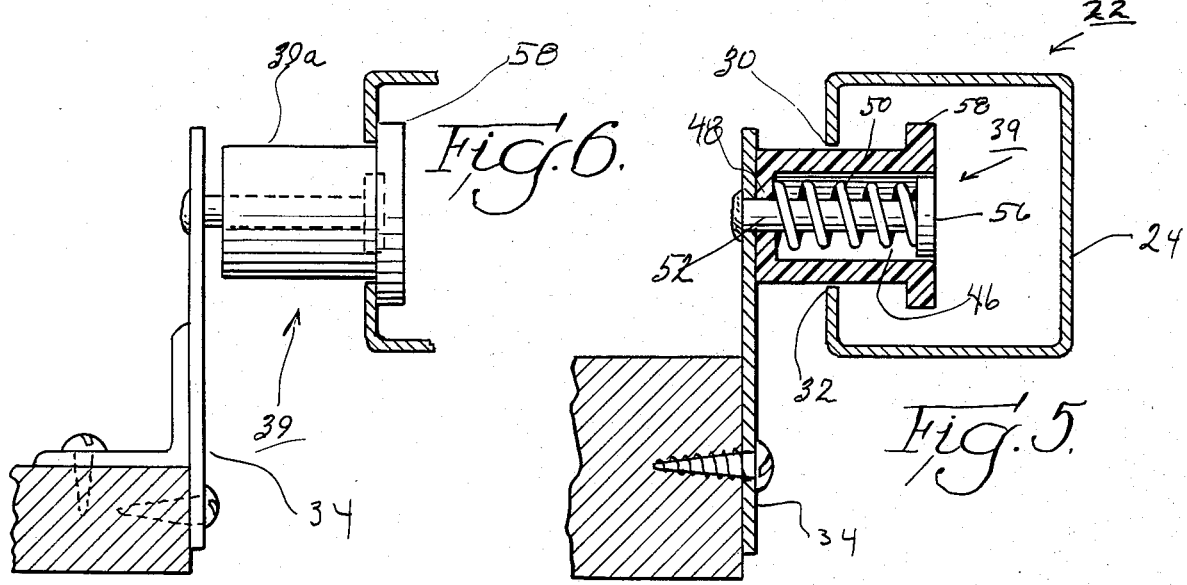

PICKUP TRUCK CAP HAVING A ROLL-AWAY DOOR

BACKGROUND OF THE INVENTION

1. Field of Invention and Prior Art

The invention relates to a pickup truck cap with a roll-away or sectional overhead door.

Heretofore, caps for pickup trucks have been provided with various types of doors, usually two-part doors comprising a hatch-back door for the cap per se, functioning in cooperation with the tailgate of the truck. Sometimes a regular door, such as used in pickup campers is provided with suitable framework filling in the space around the doorway. The doors heretofore used have the disadvantage that, when they swing out or, if they swing in, they are always in the way of something or somebody.

2. Objects of the Invention

It is an object of the invention provide a cap with a roll-away or sectional overhead door which is capable of providing a large opening in which no parts of the door project outwardly to interfere with the use of the truck or, inwardly, to seriously constrict the usable interior space. A further object of the invention is to avoid the disadvantages of the art and to obtain such advantages as will appear as the description proceeds.

SUMMARY OF THE INVENTION

The invention relates to a cap for a pickup truck which comprises:

side portions arranged to form an extension of the side walls of the box of said truck, a cover portion spanning said side portions, a top cross-panel extending from one side portion to the other and depending from the cover portion, side panels unitary with said top cross-panel which project inwardly from said side portions and extend downwardly beyond said side portions, the said downwardly-extending portions of said side panels being shaped to fit the tail gate receptor of said box, said cross-panels and said side panels forming a rectangular opening, a sectional overhead door, track means fastened to said side panels and to said roof, adapted to guide said sectional overhead door from a position closely underlying said cover portion to a position in juxtapostion to the inner sides panels, and said track means comprising tubular channels having apposed, narrow, rolling surfaces and said overhead door having rollers affixed thereto adapted to roll on said apposed rolling surfaces.

More particularly, the invention relates to the further feature in which a bottom cross-panel unitary with said side panels and said top cross-panel to form a frame having a rectangular opening, said bottom cross-panels extending downwardly below the bed of the said box and being provided with means adapted to overlie the bed of said box and adapted to be fastened thereto when said cap is in place.

Still more particularly, the invention relates also to the further feature in which said rollers are spring-loaded and are provided with an inner flange adapted to abut the inner sides of said narrow, rolling surfaces; advantageously, in which each said roller comprises a spool-shaped roller having a cylindrical bore provided with a restricted opening at one end, a compression coil spring disposed in said bore and abutting said restricted opening, and a trunion pin extending through said coil spring and through said restricted opening to said door where it is fastened, and having a head of essentially the same dimension as that of said bore, said coil spring being under compression between said restricted opening and said head, and said flange being disposed at the end of said spool over said head; and, advantageously, in which the door frame is fastened to the cover portion by means of mating channel members which function as a semi-hinge.

BRIEF DESCRIPTION OF THE DRAWINGS

In the drawings:

FIG. 1 is a perspective view of the rear of a pickup truck the camper cap in place showing in dotted lines the tracks or guides for an overhead door;

FIG. 2 is a longitudinal sectional view through a rear portion of the truck illustrating the general framework of the cap, the door, and the overhead track taken along line 2—2 of FIG. 1;

FIG. 3 is a cross-sectional view showing the brackets for suspending the tracks and one means of attaching the cap to the truck body taken along line 3—3 of FIG. 7;

FIG. 4 is a sectional perspective view showing one means of attaching the rear panels of the cap to the truck body and also attaching the track to the rear panel;

FIG. 5 is a detailed sectional view of the track and spring-loaded rollers attached to a thick door;

FIG. 6 is a detailed sectional view of the track and spring loaded rollers attached to a thin door also showing rollers under spring tension;

FIG. 7 is a detailed view in section of a modified form of the invention; and

DESCRIPTION OF THE PREFERRED EMBODIMENTS

In the drawings there is illustrated a cap for a pickup truck in which 10 represents the truck body or box of the truck, 12 the cap, 14 a sectional or roll-away overhead door, 15 the frame which frames the door 14 and has side panels 16 and a top cross-panel 18. The frame fills the space circumscribed by the cover portion 20, the side portions 12a of the cap portion 10a of the box, and the truck bed 13 thereof.

Guide channels 22 having vertical and horizontal portions 24 and 26, respectively, are fixed respectively to the inner sides of the side panels 16 and the cover portion 20 of the cap. A curvilinear portion 28 connects the vertical and the horizontal portions of the guide channel.

The guide channel 22 is tubular in cross-section and has a longitudinal side opening facing the sides of the door 14, which opening is provided with apposed, narrow, rolling surfaces 30 and 32. Suitably, the guide member 22 is an aluminum extrusion which, suitably, may be square in cross-section, as shown in FIG. 5. Other materials, such as vinyl can also be used.

Fastened to the side edges of the door 14 are suitable rollers 36 adapted to roll on the narrow, rolling surfaces 30 and 32. Suitably, these rollers may be made of nylon, or the like. Suitably, they are mounted on a plate 34, adapted to be fastened to the sides of the door, as shown in FIG. 5, or to an angle piece fastened to the door in case a thin door is used, as shown in FIG. 6. If desired, the plate 34 in FIG. 5 can be swung around 90 degrees so that it lies lengthwise of the door and the roller 36 is opposite the edge of the door. In such case, the vertical portion 24 of the guide 22 will be mounted flush with the inside of the side panels 16. In any case, the arrangement is such that, when the door is raised, it rolls back under the cap in close proximity to the cover portion 20 and, when the door is closed, it is juxtaposed to the inner surfaces of the frame 15.

FIG. 3 illustrates one means for fastening the track portions 26 to the cover portion 20 and have the advantage that they allow these track portions to move slightly as the truck sways. Thus, the brackets 33 slope inwardly, as shown at 35, which allows for limited spring action. In a similar manner, the spring-loaded rollers 36 accommodate the swaying of the truck. The cap 10 is fastened to the side walls 13a of the truck in the usual manner by 'C' clamps, or the like, not shown, or by sheet metal screws.

Suitable means are provided for fastening the side panels 16 to the side walls 10a of the truck box. When the tailgate is removed from the truck, there is left exposed the portion adapted to receive the tailgate, which is referred to herein as a tailgate receptor. This comprises a recess 36 into which the tailgate fits, and stop portions 38 against which the tailgate abuts. The frame 15 is shaped to fit the recess 36 of the tailgate receptor and to abut the stops 38. Suitable means for fastening the frame 15 to the truck box may be provided. Suitable such means comprises the angle piece shown at 42, which latter is provided with a suitable set screw 44 to fasten the side panels 16 to the tailgate receptor. The angle piece 42 can have a section 43 bent up to provide a support for the vertical portion 24 of the guide 26.

The rollers 39 comprise a spool-shaped member 39a having a cylindrical bore 46 provided with a restricted opening 48 at one end. A coil spring 50 is disposed in the cylindrical bore 46 with one end abutting the restricted opening 48 and a trunnion pin 52 is threaded through the coil spring and the opening 48 and is fastened to the door bracket 34. Trunnion pin 52 has a head 56, having substantially the same diameter as the cylindrical bore 46 and is pushed in until the spring 50 is under compression and the head 56 is flush with the flanged end 58 of the spool 39 and fastened to the door bracket 34 by threads, swaging, or like means. Flange 58 is of such dimension as to keep the roller from passing the apposed, narrow rolling surfaces 30-32.

In a preferred embodiment of the invention, the door frame 15 is provided additionally with a bottom cross-panel 64 unitary or integral with the side panels 16. This cross-panel 64 is relatively narrow and is adapted to extend below the bottom 13 of the truck bed and to abut the end 62 of the truck bed from one side to the other. The sides of the box extend slightly beyond the bed of the truck, as shown in FIG. 7, and form part of the tailgate receptor referred to above. The top of the bottom cross-panel 64 is arranged to be coincident with the top of the bed 13. If desired, an angle member 66 can be fastened to the bottom cross-panel 64 with a portion thereof 68 extending to overlie the truck bed, thereby providing a smooth sill for the door 14. The overlapping portion 68 of the angle piece is also useful for fastening the frame 15 to the truck body. This can be done by suitable sheet metal screws, not shown.

There is thus provided a cap for a pickup truck having provision for a door which extends from adjacent the cover portion of the cap to the truck bed and, which when opened, is neatly tucked away under the cover portion of the cap and does not substantially restrict the inner capacity of the truck or interfere with the free movement exteriorly therof.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. A cap for a pickup truck which comprises:
    side portions arranged to form an extension of the side walls of the box of said truck,
    a cover portion spanning said side portions,
    a top cross-panel extending from one side portion to the other and depending from the cover portion,
    side panels which project inwardly from said side portions and extend downwardly from said top cross-panel, forming a rectangular opening,
    a sectional overhead door,
    track means fastened to said side panels and to said cover, adapted to guide said sectional overhead door from a position closely underlying said cover portion to a position in juxtaposition to the inner sides of said panels, and
    said track means comprising tubular channels having apposed, narrow, rolling surfaces and said overhead door having rollers affixed thereto adapted to roll on said apposed rolling surfaces.

2. A cap for a pickup truck according to claim 1, in which said rollers are spring-loaded and are provided with an inner flange adapted to abut the inner sides of said narrow, rolling surfaces.

3. A cap for a pickup truck according to claim 2, in which each said roller comprises a spool-shaped member having a cylindrical bore provided with a restricted opening at one end, a compression coil spring disposed in said bore and abutting said restricted opening, and a trunnion pin extending through said coil spring and through said restricted opening to said door where it is fastened, and having a head of essentially the same dimension as that of said bore, said coil spring being under compression between said restricted opening and said head, and said flange being disposed at the end of said spool over said head.

4. A cap for a pickup truck according to claim 1, in which said side panels extend downwardly beyond the side portions of said cap and are shaped to fit where the tail gate normally fits in said box.

5. A cap for a pickup truck according to claim 4, which further comprises a bottom cross-panel unitary with said side panels and said top cross-panel to form a frame having a rectangular opening, said bottom cross-panels extending downwardly below the bed of the said box and being provided with means adapted to overlie the bed of said box and adapted to be fastened thereto when said cap is in place.

6. A cap for a pickup truck according to claim 5, in which said rollers are spring-loaded and are provided with an inner flange adapted to abut the inner sides of said narrow, rolling surfaces.

7. A cap for a pickup truck according to claim 1, in which said downwardly extending portions of the side panels extend down below the sides of the truck bed into the space left when the tailgate is removed.

8. A cap for a pickup truck according to claim 1, in which said rolling surfaces are formed by inturned apposed lips.

9. A cap for a pickup truck according to claim 7, in which said rolling surfaces are formed by inturned apposed lips.

* * * * *

UNITED STATES PATENT AND TRADEMARK OFFICE
CERTIFICATE OF CORRECTION

PATENT NO. : 4,511,173
DATED      : April 16, 1985
INVENTOR(S) : Harold G. Wentzel It is certified that error appears in the above-identified patent and that said Letters Patent is hereby corrected as shown below:

```
Col. 1, line 20; after "invention" insert -- to --
Col. 1, line 49; "juxtapostion" should read -- juxtaposition --
Col. 1, line 49; after "sides" insert -- of said --
Col. 2, line 2; "trunion" should read -- trunnion --
Col. 2, line 63; "36" should read -- 39 --
Col. 3, line 2; "36" should read -- 39 --
Col. 3, line 16; "36" should read -- 39 --
Col. 3, line 44; "39" should read -- 39a --
Col. 4, line 2; "therof." should read -- thereof. --
```

Signed and Sealed this

Twenty-first Day of January 1986

[SEAL]

Attest:

DONALD J. QUIGG

Attesting Officer

Commissioner of Patents and Trademarks